Nov. 24, 1953     S. W. HAYES     2,660,128
METAL-WORKING APPARATUS
Original Filed Dec. 28, 1943     5 Sheets-Sheet 1
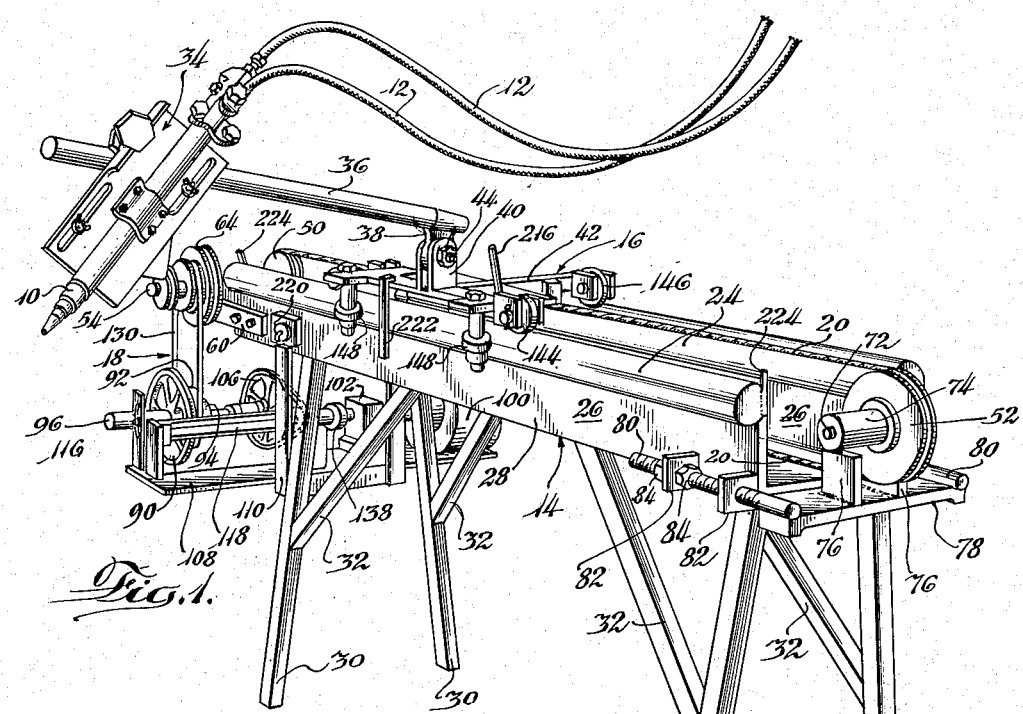
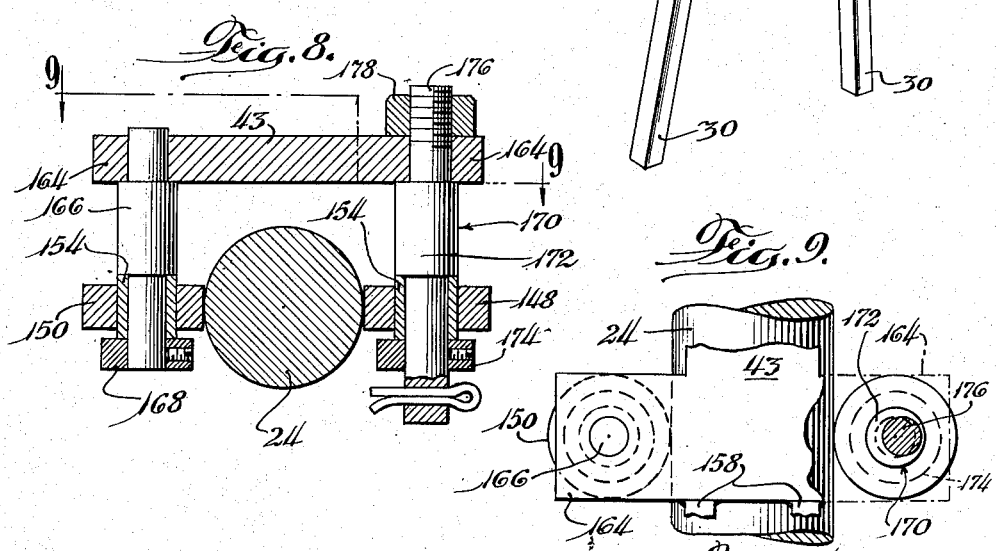
Inventor:
Stanley W. Hayes
By Hinkle, Horton, Ahlberg, Hansmann & Hupper
Attorneys.

Nov. 24, 1953 — S. W. HAYES — 2,660,128
METAL-WORKING APPARATUS
Original Filed Dec. 28, 1943 — 5 Sheets-Sheet 2

Inventor:
Stanley W. Hayes
By Hinkle, Horton, Ahlberg, Hansmann & Wupper
Attorneys.

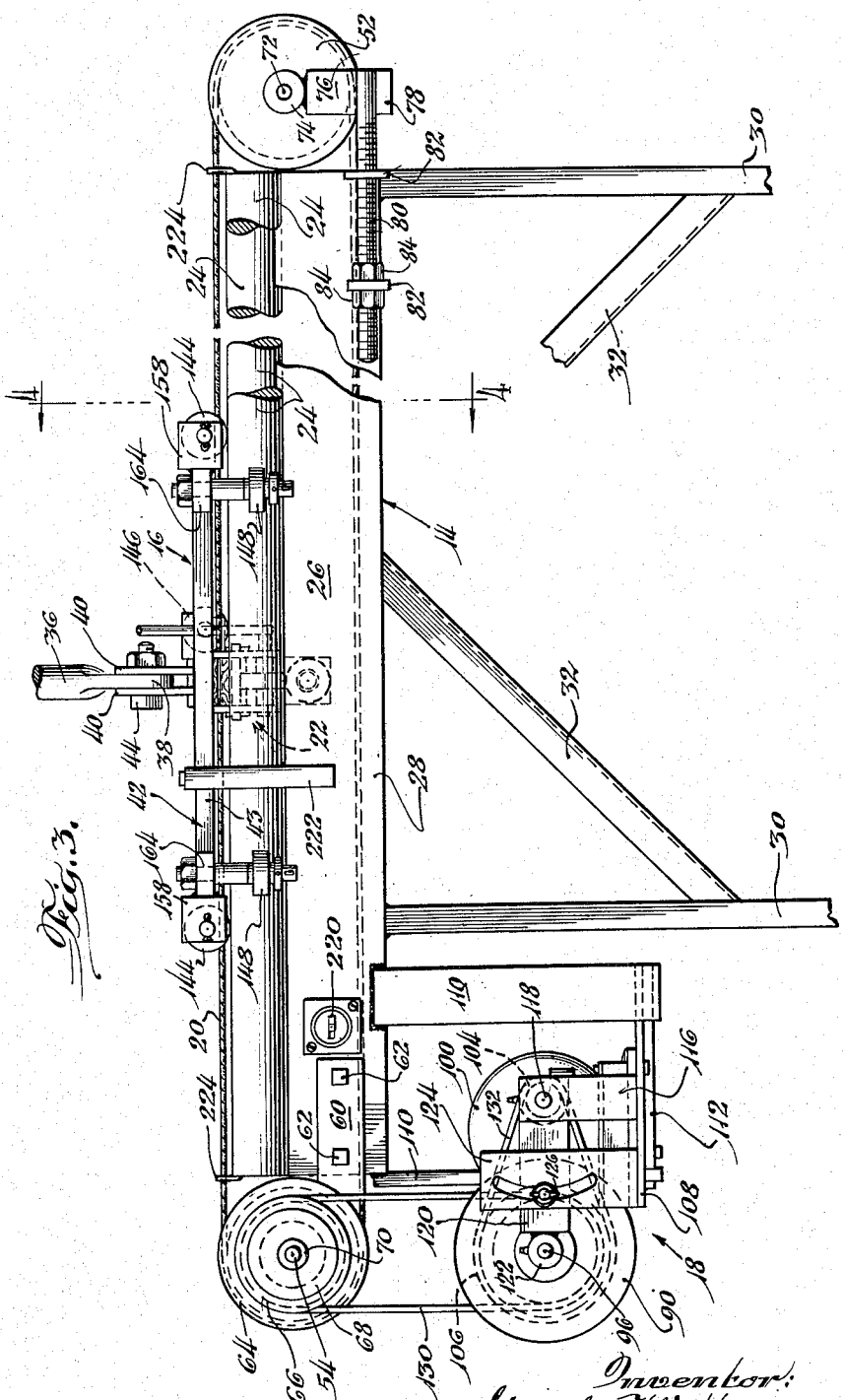

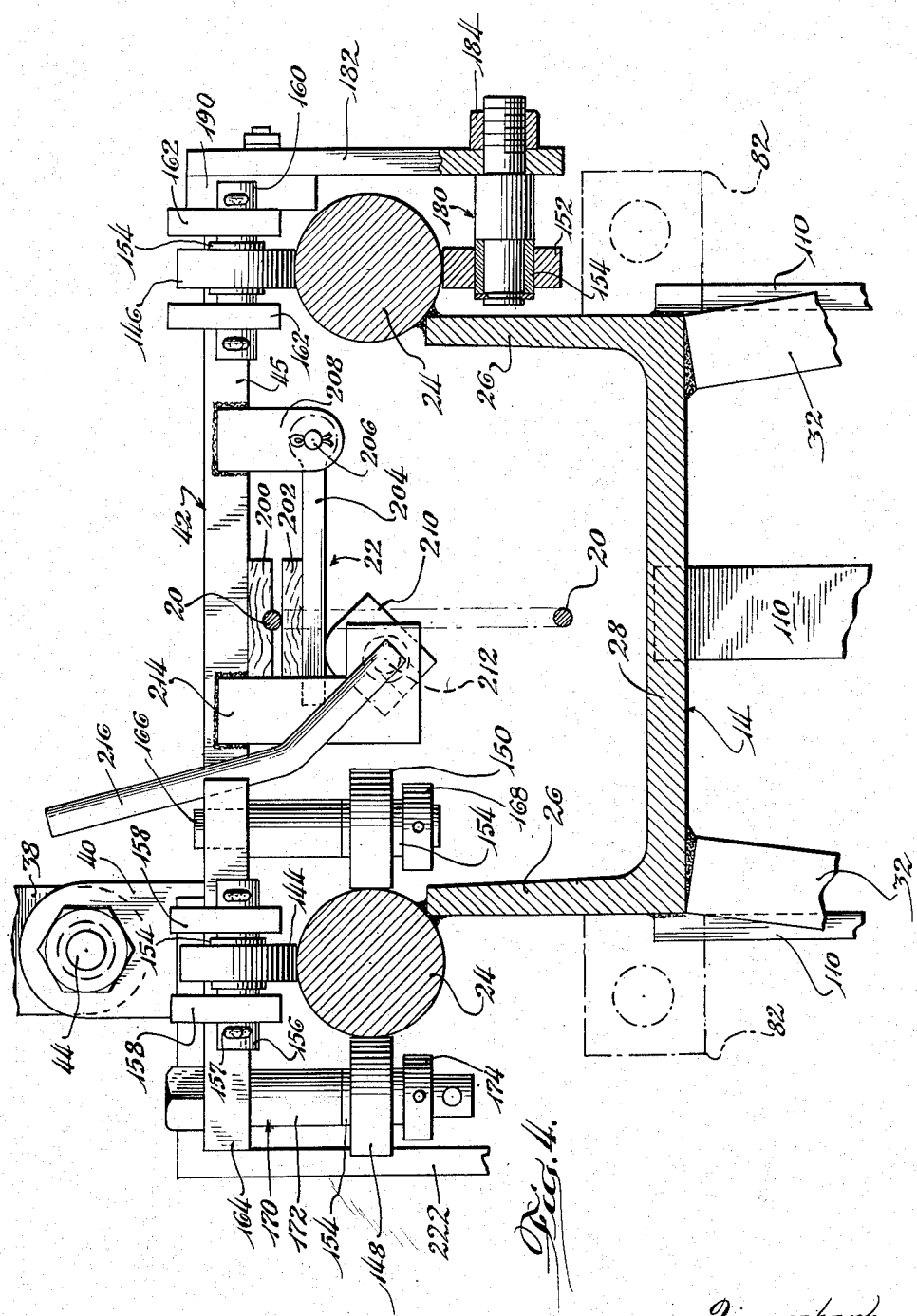

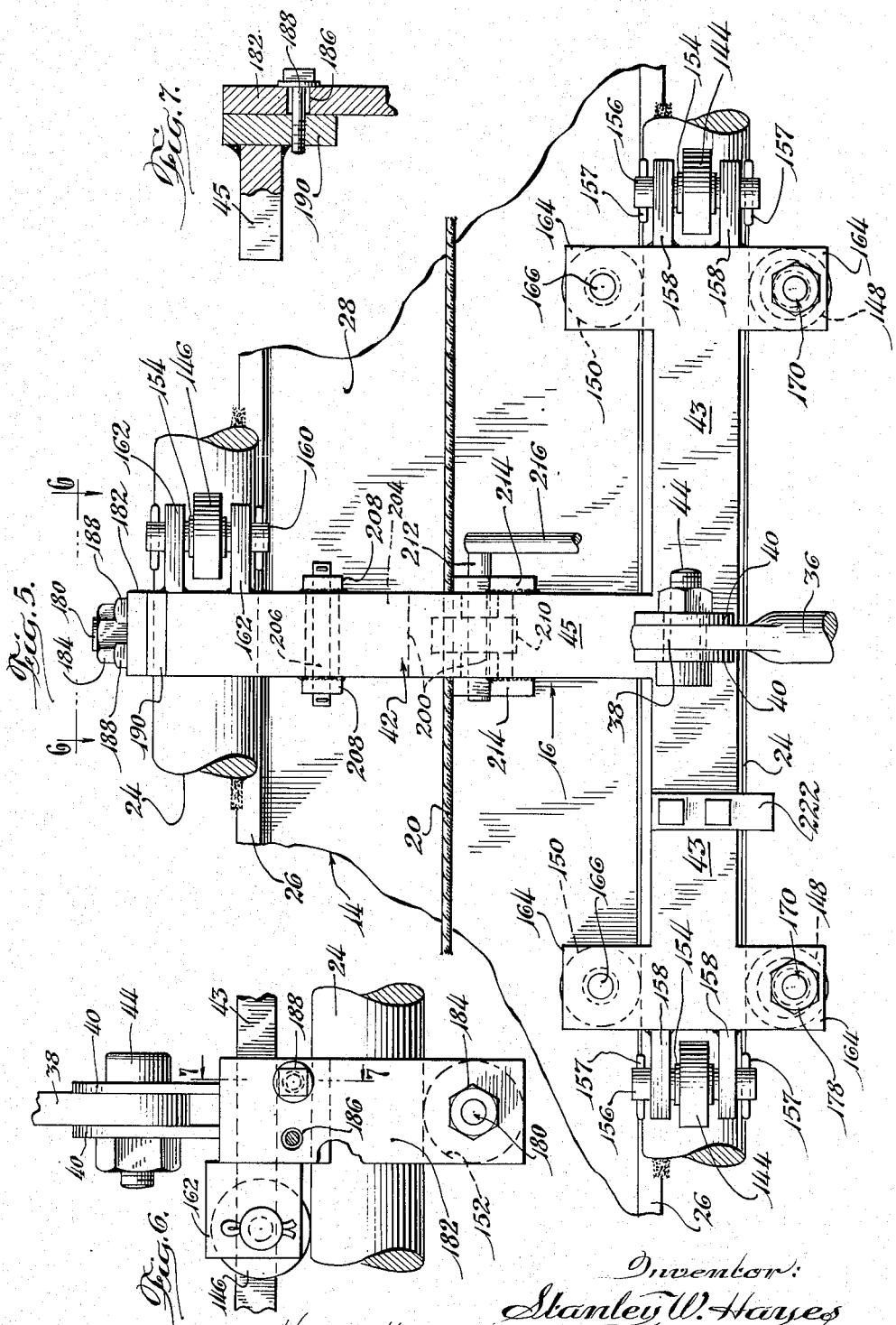

Patented Nov. 24, 1953

2,660,128

UNITED STATES PATENT OFFICE 2,660,128

METAL-WORKING APPARATUS

Stanley W. Hayes, Richmond, Ind., assignor to Hayes Track Appliance Company, Richmond, Ind., a corporation of Indiana Original application December 28, 1943, Serial No. 515,937, now Patent No. 2,481,421, dated September 6, 1949. Divided and this application April 27, 1949, Serial No. 89,840

7 Claims. (Cl. 104—246)

The present invention relates to metal working apparatus and in particular to an improved track and movable carriage structure for a new and improved straight line torch cutting machine.

This application is a division of the copending application of Stanley W. Hayes, Serial No. 515,937, filed December 28, 1943, issued as Patent No. 2,481,421, dated September 6, 1949.

In the past most of the straight line torch cutting machines comprised a small, motor operated torch supporting carriage movable upon a track on the work. Machines of this character are not adapted for cutting plates other than big ones, whereas an advantage of the apparatus of the present invention is that it can be used to cut up small pieces, such as scrap, whenever straight line cuts are desired.

Pantograph machines have sometimes been used but these have the disadvantage that it is necessary manually to guide the tracing wheel. As compared with machines of this character, the apparatus of the present invention is simpler to construct and easier to operate—even when made of sufficient length to cut long straight lines, it will not have unwieldly dimensions as would the pantograph machine.

An object of the present invention is to provide a metal work cutting apparatus incorporating new and improved cooperating track and carriage structures.

Another object is to provide a metal working apparatus utilizing a track structure comprising a pair of cylindrical members secured to a base support.

Another object is to provide a metal working apparatus utilizing a track structure comprising a pair of cylindrical members secured to a base support so that the horizontal upper and lower and vertical portions of the cylindrical members are exposed.

Another object is to provide a new and improved supporting means for a movable carriage.

Another object is to produce a new and improved means for movably holding and guiding the carriage on its supporting means or track.

A further object is to provide a new and improved adjustment means for the carriage to adjust it to its supporting means or track.

And still another object is to provide a new and improved carriage and track for a metal working apparatus so that the overhanging weight of the torch and associated boom or arm will not upset the carriage.

Other objects and advantages will become apparent from the following description taken in conjunction with the accompanying drawings:

Fig. 1 is a general perspective view of the apparatus of the present invention viewed from the front and one end;

Fig. 3 is a front view of the apparatus;

Fig. 4 is an enlarged cross-sectional view taken substantially along the line 4—4 of Fig. 3 and illustrating the movable carriage mainly in elevation (but omitting details of the driving means on the opposite side of the carriage for clarity);

Fig. 5 is an enlarged plan view of the carriage showing details of construction and a fragment of the carriage supporting means;

Fig. 6 is an elevational view of the rear of the carriage and is taken substantially along the line 6—6 of Fig. 5;

Fig. 7 is a fragmentary cross-sectional view showing one adjustment means and is taken substantially along the line 7—7 of Fig. 6;

Fig. 8 is a cross-sectional detailed view on an enlarged scale of a portion of the carriage supporting and guiding means and is taken substantially along the line 8—8 of Fig. 2 and Fig. 9 is a fragmentary plan view, partly sectional in character, taken along the line 9—9 of Fig. 8.

Figure 2:
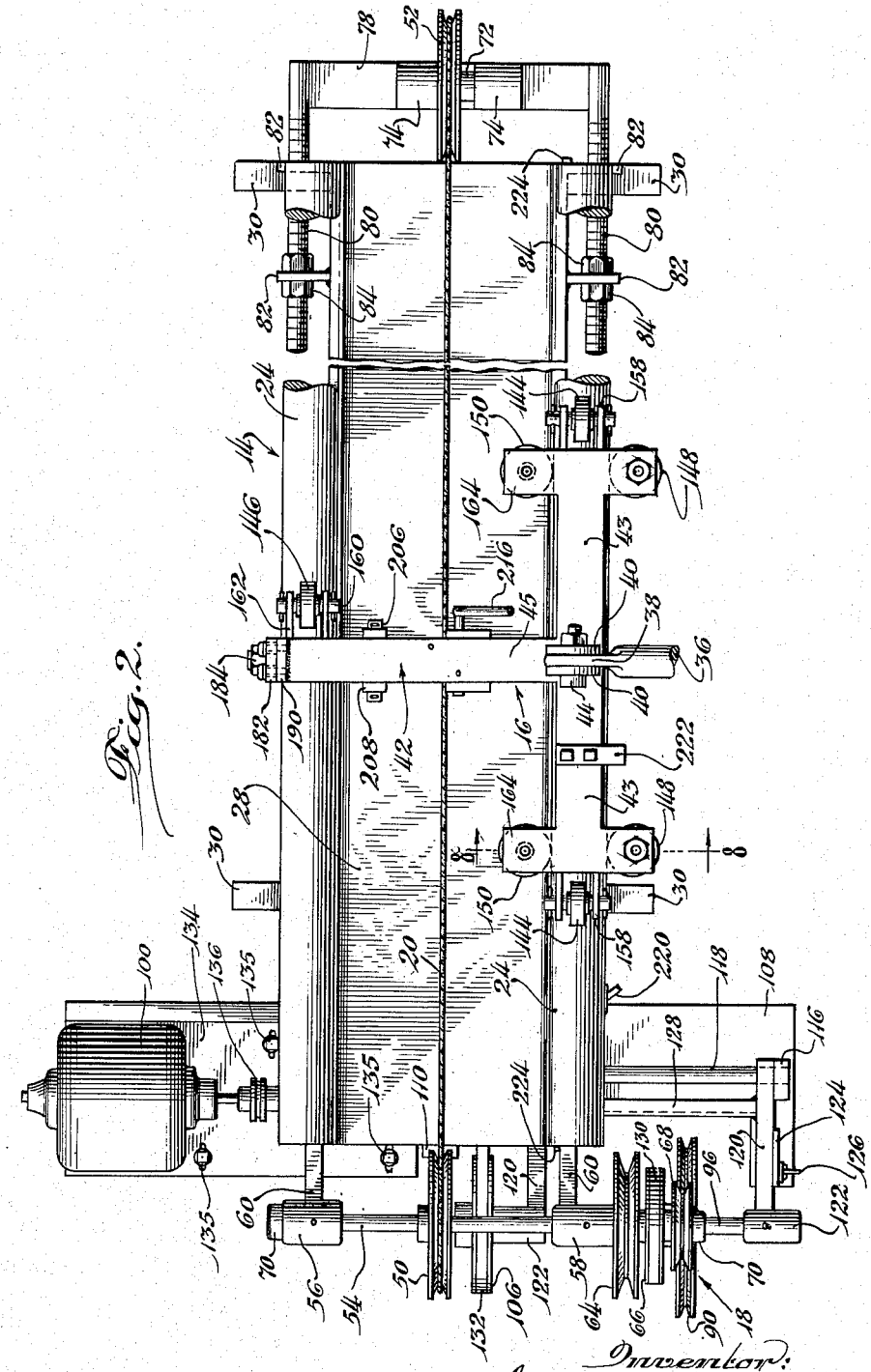
Fig. 2 is a plan view of the apparatus.

Referring now to the drawings, and particularly to Fig. 1, it may be noted that the metal working apparatus of the present invention is a cutting apparatus of the type employing a torch 10 supplied with a combustible medium through the flexible conduits 12 from a tank or tanks (not shown). The apparatus includes a stationary support 14 and a torch supporting carriage indicated generally by the reference character 16 movably mounted on the support. The torch and carriage supported by it are movable lengthwise of the support by means of a variable speed drive indicated generally by the reference character 18, and including an endless cable 20 to which the carriage may be clutched by a clutch mechanism, indicated generally by the reference character 22 (Fig. 4).

The stationary support 14 is primarily characterized by a pair of longitudinal tracks 24, preferably made of cold rolled shafting, secured as by welding to the upper outer corners of the upwardly extending flanges 26 of a shipbuilding channel 28 supported in horizontal position upon four legs 30 which are suitably braced to the channel by braces 32. The legs and braces may be welded to each other and to the transverse portion of the channel 28, thereby to provide a simple and sturdy supporting frame for the apparatus. If desired, an H beam could be used in place of the channel 28.

The torch supporting carriage 16 is movably mounted on the stationary support and specifically upon the shafting 24, which thus constitute "ways" for the carriage. In the embodiment of the invention ilulstrated the carriage supports the torch 10, but it should be understood that many of the principles of the present invention may be embodied in an apparatus wherein the torch is fixed and the work is mounted on the carriage for movement with respect to the torch. Furthermore, a plurality of torches can be mounted upon the carriage.

The torch 10 is secured to a torch support indicated generally by the reference character 34 (which may be constructed in accordance with the disclosure of United States Letters Patent No. 2,317,562, granted April 27, 1943), whereby the torch may be readily secured in various positions. The torch support is mounted upon an arm 36 angularly adjustable relative to the movable carriage 16. The angular adjustment is provided by pivotally mounting a lug 38, secured to one end of the arm 36, upon a pair of upright ears 40 suitably secured as by welding to the upper side of a generally T-shaped carriage chassis 42. The arm is secured in adjusted position by means of a bolt 44 passing through the lug and the upright ears (Figs. 4 and 6).

Referring particularly to Figs. 2 and 3, endless cable 20, by which the movable carriage is propelled through the variable speed driving means 18, is secured to the frame in such manner that the tension thereof may be readily adjusted. The cable 20 is mounted on a pair of pulleys 50 and 52 the latter of which is adjustable relative to the former and to the stationary support 14. Pulley 50 is fixedly secured to a drive shaft 54 journaled for rotation in a pair of spaced apart bearings 56 and 58 suitably secured to the upright flanges 26 of the channel 28, as by supporting arms 60 to which the bearings are secured as by welding, and which are in turn secured to the flanges by a plurality of bolts 62. The pulley 50 is located between the bearings 56 and 58, while a plurality of different diameter pulleys 64, 66 and 68 are secured to the end of the shaft 54 projecting beyond the bearing 58. Undesired endwise movement of the shaft is prevented by collars 70 secured to its opposite ends.

The adjustable pulley 52 is mounted on a shaft 72 journaled for rotation in a pair of bearings 74. The bearings 74 are secured as by welding to the upper sides of a pair of uprights 76 secured in turn to a horizontal supporting plate 78 adjustably mounted relative to the stationary support 14. The plate 78 is secured to the ends of a pair of relatively long studs 80 movable into adjusted positions relative to the stationary support. The studs 80 extend through pairs of spaced apart transverse lugs 82 secured to the flanges 26 of the channel 28 and each of the studs is held in adjusted position by a pair of locking nuts 84 located at opposite sides of one of the pairs of lugs 82. It is thus a relatively simple matter to place the required tension on the endless cable 20. It should be noted that if desired the supporting arms 60 for the other pulley 50 might also be adjustable lengthwise of the stationary support.

The cable 20 is preferably a steel cable having its ends spliced and soldered, but it could be a perforated steel ribbon, a link belt chain, or the like.

The variable speed drive of the endless belt includes in addition to the pulleys 64, 66, and 68 a number of different dameter pulleys 90, 92 and 94 (Fig. 1) nonrotatably mounted upon a movable countershaft 96 and driven by an electric motor 100 through a speed reducer 102 and the pulleys 104 and 106, the latter of which is fixedly secured to the countershaft 98. The driving means is mounted upon a base plate 108 secured to the stationary support 14 by a plurality (three) of downwardly extending supports 110, to the lower ends of which are secured a mounting plate 112 to which the base plate 108 is secured by a plurality of bolts (not shown). The countershaft 96 is supported on the base plate 108 so that it may be angularly adjusted relative thereto. The countershaft support is supported by means including a pair of upwardly extending lugs 116, across which extend the shaft 118 pivotally supporting a pair of arms 120 to the outer ends of which are secured a pair of bearings 122 in which the countershaft 96 is journaled for rotation. The countershaft may be locked in adjusted positions by an arrangement including a slotted upwardly extending plate 124 secured to the base plate 108 and a wing nut 126 secured to one of the countershaft support arms 120. In order to add to the rigidity of the countershaft assembly the supporting arms 120 are also interconnected by a cross piece 128.

The three pulleys mounted on the endless belt drive shaft 58 and upon countershaft 96 may be variously interconnected by a belt 130, illustrated as being of the V-type. If desired a link belt working on sprockets could be utilized so as to provide a more positive drive without maintaining the belts tight. The pulleys 104 and 106 are interconnected by a similar V-belt 132 through which the countershaft 96 is driven at a constant speed by the motor 100 and speed reducer 102. The motor may be a 1750 R. P. M. ¼ H. P. motor and the speed reducer may have a reduction of 900 to 1.

The motor 100 and speed reducer 102 are mounted on a separate base plate 134 (Fig. 2) secured as by a plurality of bolts 135 to the main base plate 108. The motor and speed reducer are interconnected through a flexible coupling 136, and the speed reducer and pulley 104 are similarly connected through a flexible coupling 138 (Fig. 1). The pulley 104 is journaled for rotation in a relatively long bearing (not shown) mounted upon an upwardly extending lug secured to the base plate 134. The details of the driving means and its support, not being an integral part of the invention claimed in this application, are more fully illustrated in the aforesaid application, Serial No. 515,937, Patent No. 2,481,421.

The movable carriage 16 includes a number of novel features insuring an accuracy of movement. It includes the previously referred to generally T-shape chassis 42 having a front portion 43 connected to a rearwardly extending transverse portion 45 and upon which portion 43 the torch carrying arm 36 is adjustably mounted at its junction with the portion 45. To provide the necessary vertical support for horizontal movement the chassis has secured to it three wheels adapted to bear on the upper surfaces of the tracks 24. Two of the wheels 144 are located at that side of the apparatus whereat the arm 36 and torch 10 are located, while the third wheel 146 is located at the opposite or rear side. To prevent tipping and to insure accurate movement of the carriage on the track, a pair of wheels 148 is provided to bear against the vertical front surface of the front track 24, a pair of wheels 150 is located to bear against the rear vertical side of the same track, and a single wheel, 152, is provided to bear against the under side of the rear track 24.

The wheels may be made in any suitable manner, but it is preferred that each wheel be provided with an inner bronze bushing 154 illustrated in conjunction with the wheel 152 in Fig. 4, and with the wheels 148 and 150 in Fig. 8 so that the wheel may rotate relative to its supporting shaft or pin. The wheels 144 are supported by pins 156 extending through a pair of vertically arranged spaced apart lugs 158 between which the wheels are located and which are secured to the front portion of the T-shaped chassis member 42. The pins 156 may be retained in place by suitable means such as cotter pins 157. The wheel 146 is similarly mounted to the rear end of the portion 45 by a pin 160 extending through a pair of vertically arranged spaced apart lugs 162 secured to the portion 45 and between which the wheel 146 is located.

The wheels 148 and 150 are secured to opposite transverse projections 164 from the front portion 43 of the T chassis, as best illustrated in Figs. 5, 8 and 9. The wheel 150 is secured to the chassis by a downwardly extending stud 166 having an enlarged central portion between which and a collar 168 the wheel 150 is mounted. The wheel 148 is mounted on the chassis so that its position can be adjusted relative to the way, i. e., the axis of rotation of the wheel 148 may be adjusted relative to the axis of the way 24, thereby to insure accurate movement of the carriage. The wheel is mounted upon a stud 170 having a central enlarged portion 172 between which and a collar 174 the wheel is rotatably mounted. The stud includes a threaded upper portion 176 which is offset relative to the intermediate portion, as best illustrated in Figs. 8 and 9, so that upon loosening a nut 178 the stud may be rotated to vary the position of the roller 148 relative to the way 24.

The wheel 152 located underneath the rear way 24 is mounted upon a stud 180 similar to the stud 166 but removably attached to a bracket 182 by a nut 184 (Figs. 4 and 6). The wheel 152 is adjustable vertically so that accuracy of engagement with the way 24 is provided. The adjustability is provided by the arrangement enabling the depending bracket 182 to be moved vertically to the chassis 42. This arrangement includes enlarged apertures 186 near the upper end of the bracket through which extend a pair of studs 188 secured to a small plate 190 rigidly secured to the rear end of the transverse portion 45 of the chassis 42.

It will be observed from the plan views (Figs. 2 and 5) that the mounting ears 40 for the torch arm 36 are affixed to the chassis 42 at the junction of the front portion 43 with the transverse portion 45. It will also be observed that the front portion 43 is parallel with and extends over the front track or way 24 so that the entire downward component of the weight of the torch, arm and associated mechanism is imposed upon the front track 24 through the wheels 144. The overturning of the carriage 42 by the overhanging arm 36 and torch 10 is prevented by the wheel 152 which rides on the bottom horizontal side of the rear rail 24. Since it is desirable from the standpoint of ease and proper operation that the carriage 42 move straight along the rails or ways 24, the importance of the guiding rollers 148 and 150 can be appreciated, and when the rollers 148 are properly adjusted the rollers 144 ride on the upper horizontal portion of the tracks or ways 24 and substantially at the upper end of the vertical diameter of the track 24. For the same reason, the rollers 146 and 152 engaging the upper and lower horizontal surfaces of the rear rail on way 24 must be fairly closely aligned and both must engage their respective horizontal portions of the rail without binding. The adjustability of the rollers 148 and 152 is an important feature of the present invention in properly aligning and positioning the chassis so that it rides properly upon the ways without canting to one side or tipping therefrom.

The carriage is adapted selectively to be connected to an endless belt by a clutch mechanism 22 which is best illustrated in Fig. 4, to which reference is now had. The clutch mechanism includes a pair of jaw members 200 and 202 between which the cable 20 may be gripped. The jaw 200 is fixedly secured to the under side of the chassis member 42 and the jaw 202 is fixedly secured to a pivotally mounted supporting arm 204. The arm 204 is pivotally supported by a structure including a pin 206 and a pair of depending lugs 208 secured to opposite sides of the transverse portions 45 of the chassis member 42. The clutch jaws 200 and 202 are preferably made of hardwood and secured by screw bolts (not shown) to the chassis and supporting arm, respectively. The use of wood results in less wear on the cable 20. If desired, only a facing of wood could be used, or fiber or soft metal such as lead could be used.

The clutch is adapted selectively to be clutched and declutched by a pivotally movable cam 210 engageable with the movable jaw mounting member 204. The cam is fixedly secured to a shaft 212 pivotally mounted upon a pair of lugs 214 extending downwardly from and secured to opposite sides of the transverse portion 45. An operating lever 216 is secured to one end of the shaft 212 so that an operator may readily effect the engagement and disengagement of the clutch jaws with the endless cable 20.

In order to stop the carriage when it has been moved in cutting direction to a predetermined point, the carriage is adapted to open a switch 220 controlling energization of the motor 100. The switch is actually operated by an arm 222 secured to the carriage and projecting downwardly to engage the switch operating lever. Stops 224 are located at opposite ends of the track as a precautionary measure to prevent accidental movement of the carriage from the track when it is moved by hand or power. If the carriage is being moved under power and strikes a stop 224 the clutch 22 slips so that damage is avoided.

From the foregoing detailed description it may be noted that the apparatus may be constructed readily and economically, and while heavy enough to be firm it still is light enough to be moved about easily although this is rarely necessary except for some special job. It can be utilized to cut up large plate as well as scrap and smaller pieces whenever straight line cuts are desired. Even when made of a length to make exceptionally long cuts, the machine will not be of unwieldy dimensions.

The movable carriage is light, and when the clutch is released to release the carriage from the cable, the former can be moved back and forth with one finger. Not only is the carriage light, but it is accurately guided by the tracks and the rollers in engagement therewith. Furthermore, the construction is such that the rollers may be adjusted to secure accurate movement of the carriage even after wear has taken place.

In making a cut, the carriage is preferably initially located at the right end of the support as seen in Figs. 1 to 3, in which figures the carriage is shown at an intermediate position. Assuming that the work has been properly located and the torch 10 properly adjusted relative to it, then the clutch operating lever 216 is operated to effect engagement of the clutch jaws 200 and 202 with the endless cable 20. The motor 100 may or may not be operating at this time. If it is not, the switch 220 is closed as may be some other motor controlling switch such, for example, as a reversing switch (not shown) to place the motor into operation. Thereafter, the carriage 16 is moved at a speed determined by the setting of the belt 130 interconnecting the endless belt driven shaft 54 and the countershaft 96, which it may be remembered is driven at a constant speed through the speed reducer 102.

The movable carriage and torch are moved in a straight line at a speed determined in advance and dependent upon the nature of the cut to be made. After the carriage has been started in motion, it moves until the cut is completed when an operator may deenergize the motor. If desired, the work could be so arranged that the cut would be completed and the movement of the carriage automatically terminated by the opening of switch 220 by the arm 222 on the movable carriage. If desired, the switch could be adjustably mounted so that the carriage movement could be automatically determined at desired points. With the switch in the indicated position, then if an operator should fail to turn off the motor, the motor will be turned off automatically when the switch is operated by the arm 222. It is a relatively small matter to vary the speed of movement of the carriage. All that is necessary is that the countershaft be loosened by release of the wing nut 126. The belt 130 is thus loosened so that its position on the sets of variable speed pulleys may be changed.

In order to maintain the desired tension on the endless belt, the position of the pulley 52 may be adjusted by loosening the nuts 84 so that the studs 80 may be moved.

The three point rolling support of the movable carriage insures accurate guiding thereof by the horizontal top portions of the track 24. The pairs of rollers 148 and 150 engaging opposite vertical portions of the front track 24 insure accurate horizontal movement and the rollers 146 and 152 engaging the top and bottom portions of the rear track 24 insure accurate vertical movement of the carriage and prevent its tipping from the tracks due to the weight and positioning of the overhanging arm 36 and torch 10.

While a single embodiment of the invention has been illustrated, it is contemplated that various modifications may be made therein without departing from the principles of the present invention. It should be understood, therefore, that the details of the illustrated embodiment of the invention are not to be intended to be limitative of the invention except in so far as set forth in the accompanying claims.

Having thus described my invention, what I desire to secure by United States Letters Patent is:

1. A metal working apparatus support, including in combination, a longitudinally extending supporting member having a pair of parallel spaced upright portions and a transverse portion interconnecting said upright portions below their upper ends, and a pair of track forming shafting pieces secured to the upper outer corners of said upright portions so as to provide at each side of said longitudinally extending supporting member opposed upper and lower and opposed inner and outer track defining surfaces on said shafting pieces adapted to be engaged by the wheels of a carriage, all of said track defining surfaces except both inner surfaces being positioned to the outside of said supporting member.

2. A metal working apparatus support, including in combination, a longitudinally extending support member having spaced upright portions and a transverse portion interconnecting said upright portions below their upper ends, said upper ends lying in a common horizontal plane, and cylindrical track defining members secured to the upper outer corners of said upright portions in such positions that the vertical and horizontal longitudinally extending tangential portions of said cylindrical members are exposed to provide track surfaces, spaced apart circumferentially around said cylindrical members by approximately 90°, adapted to be engaged by the wheels of a carriage.

3. A metal working apparatus support, including in combination, a longitudinally extending supporting member having spaced upright portions and a transverse portion interconnecting said upright portions below their upper ends, and cylindrical track defining members secured to the upper outer corners of said upright portions, each of said members being secured to said upright portions along a longitudinal line on its surface below and to the inside of its longitudinal axis to provide opposed upper and lower and opposed inner and outer longitudinally extending track defining surfaces adapted to be engaged by the wheels of a carriage.

4. In a metal working apparatus, the combination including, a pair of spaced apart generally horizontally coplanar cylindrical tracks having exposed upper and lower generally horizontal and generally vertical tangential portions, means connected to said tracks to support them in said spaced apart position, a carriage body, means on said carriage body and adapted movably to support a metal working means upon and to one side of said carriage body which would tend to tip said carriage body to one side and from said tracks, and means mounted on said carriage body for movably supporting said carriage body on said tracks, said last named means including a three-point roller support having flat tread rollers riding upon the upper horizontal tangential portions of said tracks, two of said roller supports being located at the side of said carriage body having said metal working supporting means and the third at the opposite side, and a flat tread roller engaging and riding against the lower horizontal tangential portion of the track at said opposite side to resist the tipping tendency of the supported metal working means.

5. In a metal working apparatus, the combination including, a pair of spaced apart generally horizontally coplanar cylindrical tracks having exposed upper and lower generally horizontal and generally vertical tangential portions, means connected to said tracks to support them in said spaced apart position, a carriage body, means on said carriage body and adapted movably to support a metal working means upon and to one side of said carriage body which would tend to tip said carriage body to one side and from said tracks, and means mounted on said carriage body for movably supporting said carriage body on said tracks, said last named means including a three-point roller support having flat tread rollers riding upon the upper horizontal tangential portions of said tracks, two of said roller supports being located at the side of said carriage body having said metal working means supporting means and the third at the opposite side, a flat tread roller engaging and riding against the lower horizontal tangential portion of the track at said opposite side to resist the tipping tendency of the supported metal working means, and two longitudinally spaced apart pairs of flat tread rollers engaging opposite vertical tangential portions of said track at said one side, a pair of said named rollers being located adjacent each of said two roller supports at said one side of said carriage.

6. In a metal working apparatus, the combination including, a pair of spaced apart generally horizontally coplanar cylindrical tracks having exposed upper and lower generally horizontal and generally vertical tangential portions, means connected to said tracks to support them in said spaced apart position, and a carriage comprising a substantially flat T-shaped chassis member having a first portion extending longitudinally of and overlying one of said tracks and a second portion bridging across said tracks so that its outer end overlies the other of said tracks, means on said chassis member and adapted movably to support a metal working means upon and to one side of said chassis member which would tend to tip said carriage to one side and from said tracks, and means mounted on said chassis member for movably supporting said chassis member on said tracks, said last named means including a three-point roller support having flat tread rollers riding upon the upper horizontal tangential portions of said tracks, two of said roller supports being located at opposite ends of said longitudinally extending chassis member portion and the third at the outer end of said second chassis member portion, a flat tread roller engaging and riding against the lower horizontal tangential portion of said other track and opposed to said third roller to resist the tipping tendency of the supported metal working means, and two longitudinally spaced apart pairs of flat tread rollers engaging opposite vertical tangential portions of said track at said one side, a pair of said last named rollers being located at each outer end of said longitudinaly extending chassis member portion and adjacent each of said two roller supports.

7. In a metal working apparatus, the combination including, a pair of spaced apart generally horizontally coplanar cylindrical tracks having exposed upper and lower generally horizontal and generally vertical tangential portions, means connected to said tracks to support them in said spaced apart position, and a carriage comprising a substantially flat T-shaped chassis member having a first portion extending longitudinally of and overlying one of said tracks and a transverse portion bridging across said tracks so that its outer end overlies the other of said tracks, a pair of apertured upright ears on said chassis member at the junction of said longitudinal and transverse chassis member portions and adapted movably to support a metal working means upon and to one side of said chassis member which would tend to tip said carriage to one side and from said tracks, and means mounted on said chassis member for movably supporting said chassis member on said tracks, said last named means including a three-point roller support having flat tread rollers riding upon the upper horizontal tangential portions of said tracks, two of said roller supports being located at opposite ends of said longitudinally extending chassis member portion and the third at the outer end of said transverse chassis member portion, a flat tread roller engaging and riding against the lower horizontal tangential portion of said other track and opposed to said third roller to resist the tipping tendency of the supported metal working means, and two longitudinally spaced apart pairs of flat tread rollers engaging opposite vertical tangential portions of said track at said one side, a pair of said last named rollers being located at each outer end of said longitudinally extending chassis member portion and adjacent each of said two roller supports.

STANLEY W. HAYES.

References Cited in the file of this patent

UNITED STATES PATENTS

| Number | Name | Date |
|---|---|---|
| 380,011 | Bacon | Mar. 27, 1888 |
| 397,611 | Phenix | Feb. 12, 1889 |
| 671,521 | Lang | Apr. 9, 1901 |
| 944,663 | Butler | Dec. 28, 1909 |
| 1,079,501 | Lindemann | Nov. 25, 1913 |
| 1,149,919 | Keinanen | Aug. 10, 1915 |
| 1,447,895 | Schafer | Mar. 6, 1923 |
| 1,605,521 | Drake | Nov. 2, 1926 |
| 1,612,271 | Edson | Dec. 28, 1926 |
| 1,622,574 | Deady | Mar. 29, 1927 |
| 1,697,356 | Hoover | Jan. 1, 1929 |
| 1,701,013 | Ronk | Feb. 5, 1929 |
| 1,816,031 | Willis | July 28, 1931 |
| 1,973,927 | Motley | Sept. 18, 1934 |
| 1,986,413 | Ruemelin | Jan. 1, 1935 |
| 2,050,147 | Anderson | Aug. 4, 1936 |
| 2,168,986 | Harris | Aug. 8, 1939 |
| 2,182,120 | Graham | Dec. 5, 1939 |
| 2,187,731 | Davis | Jan. 23, 1940 |
| 2,246,502 | Bramsen et al. | June 24, 1941 |
| 2,253,256 | Wehr | Aug. 19, 1941 |
| 2,253,363 | Chandler | Aug. 19, 1941 |
| 2,270,242 | Anderson | Jan. 20, 1942 |
| 2,318,354 | Anjeskey | May 4, 1943 |
| 2,361,290 | Herold | Oct. 24, 1944 |
| 2,412,598 | Brush | Dec. 17, 1946 |